March 28, 1944.  A. NAGY, JR  2,345,415
AUTOMATIC STOP FOR BELT CONVEYERS
Filed Aug. 4, 1943
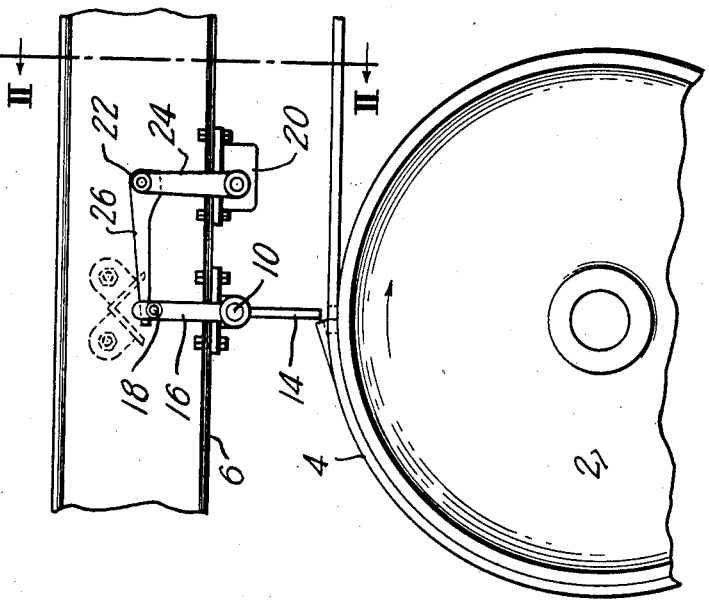
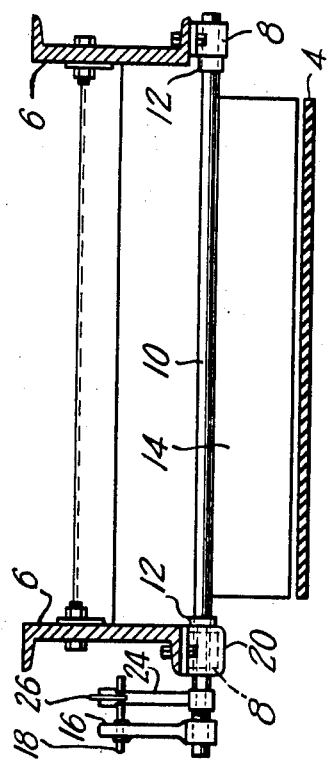
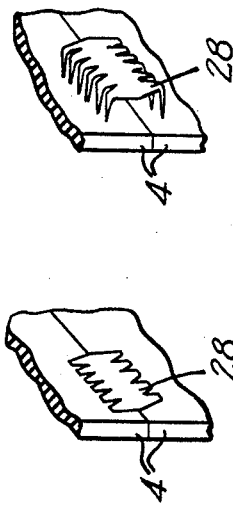
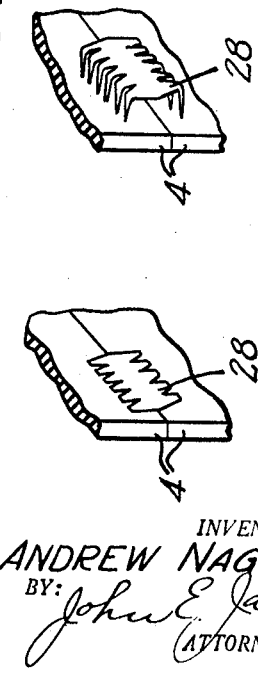
INVENTOR:
ANDREW NAGY, JR.,
BY: John E. Jackson
ATTORNEY Patented Mar. 28, 1944

2,345,415

UNITED STATES PATENT OFFICE 2,345,415

AUTOMATIC STOP FOR BELT CONVEYERS

Andrew Nagy, Jr., Monongahela, Pa.

Application August 4, 1943, Serial No. 497,372

3 Claims. (Cl. 198—232)

This invention relates to automatic stops for belt conveyers. The conveyer belt is spliced together by means of a plurality of belt clamps, for example, a 42 inch conveyer belt may have 26 clamps in a splice. Ordinarily the weakest clamp raises up and as the belt revolves on the idlers the raised clamp snags and causes the clamps on either side to pull loose. The belt keeps on traveling and, on each revolution, pulls more clamps loose until the entire splice is pulled apart. If an end clamp breaks, it catches along the sides of the conveyer, and if the rest of the splice is firm, it may not pull completely apart, but instead the belt will be torn at the weakest point along its entire length. In cold weather, ice and dust form on the drums and create a crown, thus throwing the belt from its course and causing it to fold, thereby ripping the belt. When an idler drum becomes worn, it may throw the belt from its course, thereby ripping it or pulling the splice apart.

It is an object of this invention to protect the belt from damage.

Another object is to provide means for stopping the conveyer as soon as the belt becomes defective.

These and other objects will be more apparent after referring to the following specification and attached drawing, in which:

Figure 1 is an elevation of the invention;

Figure 2 is a side view of Figure 1;

Figure 3 is a view showing a clamp about to be applied to a splice; and

Figure 4 shows the splice with a clamp in position.

Referring more particularly to the drawing, the reference numeral 2 indicates a pulley around which the conveyer belt 4 passes. Above the conveyer is a pair of spaced apart channels 6, upon which are mounted bearings 8 for rotatably supporting a shaft 10. Set collars 12 mounted on the shaft prevent endwise movement thereof. Welded to, or otherwise rigidly fixed to the shaft 10 is a baffle plate 14 which extends downwardly toward the belt 4, there normally being a slight clearance between the belt 4 and the plate 14. Rigidly connected to, and extending upwardly from one end of the shaft 10 is a lever 16 having a pin 18 fastened thereto. Mounted on the flange of the channel adjacent the lever 16 is a limit switch 20 which controls the movement of the conveyer. A bent lever 22 has one arm 24 connected to the switch 20 and the other arm 26 supported by the pin 18.

The belt 4 is spliced together by means of a plurality of clamps 28 as seen in Figures 3 and 4.

The operation of the device is as follows:

When one or more of the clamps fail, it usually causes the belt to buckle at that point and the clamp 28 to project above the belt when it comes in contact with the pulley 2. As seen in Figure 1, the projecting clamp 28 will strike the plate 14, this rotating the plate 14 about its pivot shaft 10 and causing the lever 16 and supporting pin 18 to move from under the arm 26. The lever 22 then drops, releasing the limit switch 20 and opening the circuit to the belt drive and stopping the conveyer. Upon inspection, the trouble is readily found within a few feet of the plate 14, and the belt can be repaired before further damage results. In like manner, if the belt rips or if a crown is created on the pulley 2, the plate 14 will be rotated to stop the conveyer.

While one embodiment of the invention has been shown and described, it will be apparent that other adaptations and modifications may be made without departing from the scope of the following claims.

I claim:

1. An automatic stop for a belt conveyer comprising a pivot mounted adjacent said belt, a plate on said pivot extending toward said belt, a lever on said pivot, and a switch actuable by said lever for controlling the movement of said conveyer, said plate being so positioned with respect to said belt that it will be rotated by a protuberance on said belt to rotate said lever and actuate said switch to stop the conveyer.

2. An automatic stop for a belt conveyer comprising a pivot mounted above said belt, a plate on said pivot extending toward said belt, a lever on said pivot, a pin on said lever, a switch for controlling the movement of said conveyer, and means for operating said switch, said means being supported by said pin, said plate being so positioned with respect to said belt that it will be rotated by a protuberance on said belt to remove the pin from under said means to open the switch and stop the conveyer.

3. An automatic stop for a conveyer having a spliced belt passing around a pulley comprising a pivot above said pulley, a plate mounted on said pivot extending toward said belt, a lever on said pivot, a pin on said lever, a limit switch for controlling the movement of said conveyer, and a bent lever having one arm supported by said pin and the other arm connected to said limit switch, said plate being so positioned with respect to said belt that it will be rotated by a protuberance on said belt to remove the pin from under said first named arm to open said switch.

ANDREW NAGY, JR.